United States Patent
Shapira

(10) Patent No.: US 9,877,330 B2
(45) Date of Patent: Jan. 23, 2018

(54) WLAN DEVICE WITH AUXILIARY RECEIVER CHAIN

(71) Applicant: CELENO COMMUNICATIONS (ISRAEL) LTD., Raanana (IL)

(72) Inventor: Nir Shapira, Raanana (IL)

(73) Assignee: CELENO COMMUNICATIONS (ISRAEL) LTD., Ra'anana (IL)

( * ) Notice: Subject to any disclaimer, the term of this patent is extended or adjusted under 35 U.S.C. 154(b) by 0 days.

(21) Appl. No.: 14/278,117

(22) Filed: May 15, 2014

(65) Prior Publication Data

US 2014/0355532 A1  Dec. 4, 2014

Related U.S. Application Data

(60) Provisional application No. 61/829,070, filed on May 30, 2013.

(51) Int. Cl.
*H04W 4/00* (2009.01)
*H04W 72/08* (2009.01)
*H04B 1/3805* (2015.01)
*H04W 84/12* (2009.01)

(52) U.S. Cl.
CPC .......... *H04W 72/08* (2013.01); *H04B 1/3805* (2013.01); *H04W 72/085* (2013.01); *H04W 84/12* (2013.01)

(58) Field of Classification Search
CPC ...... H04B 1/3805; H04B 1/48; H04B 7/0825; Y02B 60/50; H04W 36/0094; H04W 72/08; H04W 84/12; H04W 88/06; H04W 88/10

See application file for complete search history.

(56) References Cited

U.S. PATENT DOCUMENTS

| 6,029,052 A * | 2/2000 | Isberg .................... H03J 5/244 455/131 |
| 6,047,175 A | 4/2000 | Trompower |
| 6,944,427 B2 | 9/2005 | Haub et al. |

(Continued)

FOREIGN PATENT DOCUMENTS

WO   2006105547 A1   10/2006

OTHER PUBLICATIONS

IEEE Standard 802.11n, IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, Sections 9.19 and 20.3.12, Oct. 29, 2009.

(Continued)

*Primary Examiner* — Asad Nawaz
*Assistant Examiner* — Berhanu Belete
(74) *Attorney, Agent, or Firm* — D. Kligler IP Services Ltd.

(57) ABSTRACT

A method includes, in a Wireless Local Area Network (WLAN) device, communicating on a given communication channel using one or more primary transmission/reception (TX/RX) chains. Concurrently with communicating on the given communication channel using the primary TX/RX chains, signal activity is evaluated on one or more alternative communication channels using an auxiliary reception (RX) chain whose hardware is partially shared with one of the primary TX/RX chains.

30 Claims, 2 Drawing Sheets

(56) References Cited

U.S. PATENT DOCUMENTS

| | | | | |
|---|---|---|---|---|
| 7,463,704 B1* | 12/2008 | Tehrani | ............... | H03G 3/3068 |
| | | | | 375/267 |
| 7,830,854 B1* | 11/2010 | Sarkar | ............... | H04W 52/146 |
| | | | | 370/320 |
| 8,249,031 B1* | 8/2012 | Hirsch | ............... | H04W 72/1215 |
| | | | | 370/336 |
| 8,406,274 B1* | 3/2013 | Hirsch | ............... | H03G 3/3078 |
| | | | | 375/133 |
| 8,442,016 B1* | 5/2013 | Lee | ............... | H04W 72/1215 |
| | | | | 370/338 |
| 8,520,586 B1* | 8/2013 | Husted | ............... | H04W 74/08 |
| | | | | 370/318 |
| 8,565,112 B2* | 10/2013 | Peiris | ............... | H04M 1/7253 |
| | | | | 370/252 |
| 8,660,105 B2 | 2/2014 | Li et al. | | |
| 9,307,538 B2* | 4/2016 | Noh | ............... | H04W 72/02 |
| 2002/0126767 A1 | 9/2002 | Ding et al. | | |
| 2002/0177465 A1* | 11/2002 | Robinett | ............... | H04M 1/0214 |
| | | | | 455/550.1 |
| 2003/0017833 A1* | 1/2003 | Forrester | ............... | H04B 7/022 |
| | | | | 455/456.1 |
| 2003/0181181 A1* | 9/2003 | Darabi | ............... | H03F 1/223 |
| | | | | 455/250.1 |
| 2004/0103204 A1* | 5/2004 | Yegin | ............... | H04W 88/06 |
| | | | | 709/229 |
| 2004/0156336 A1* | 8/2004 | McFarland | ............... | H04L 1/22 |
| | | | | 370/329 |
| 2005/0059363 A1 | 3/2005 | Hansen | | |
| 2005/0068900 A1* | 3/2005 | Stephens | ............... | H04L 1/0003 |
| | | | | 370/252 |
| 2005/0180314 A1* | 8/2005 | Webster | ............... | H04L 5/023 |
| | | | | 370/208 |
| 2005/0245192 A1* | 11/2005 | Karabinis | ............... | H04B 1/006 |
| | | | | 455/12.1 |
| 2006/0063484 A1* | 3/2006 | Proctor, Jr. | ............... | H04B 7/15542 |
| | | | | 455/7 |
| 2006/0160564 A1* | 7/2006 | Beamish | ............... | H04B 1/3805 |
| | | | | 455/553.1 |
| 2006/0205443 A1 | 9/2006 | Simoens et al. | | |
| 2006/0214738 A1 | 9/2006 | Sheng et al. | | |
| 2006/0218417 A1 | 9/2006 | Sheng et al. | | |
| 2006/0221914 A1* | 10/2006 | Waxman | ............... | H04W 8/005 |
| | | | | 370/338 |
| 2006/0223450 A1* | 10/2006 | Dacosta | ............... | H04B 1/005 |
| | | | | 455/73 |
| 2007/0058739 A1* | 3/2007 | Aytur | ............... | H03G 3/3068 |
| | | | | 375/260 |
| 2007/0139105 A1* | 6/2007 | Kennan | ............... | H03F 1/0211 |
| | | | | 330/124 R |
| 2007/0207751 A1* | 9/2007 | Behzad | ............... | H04B 1/406 |
| | | | | 455/132 |
| 2007/0275669 A1* | 11/2007 | Rietman | ............... | H04W 28/06 |
| | | | | 455/70 |
| 2008/0080446 A1 | 4/2008 | Chung | | |
| 2008/0139151 A1* | 6/2008 | Ojo | ............... | H04B 1/406 |
| | | | | 455/234.1 |
| 2008/0227405 A1 | 9/2008 | Harel et al. | | |
| 2008/0293368 A1* | 11/2008 | Desai | ............... | H04B 7/0691 |
| | | | | 455/138 |
| 2009/0080388 A1* | 3/2009 | Rohfleisch | ............... | H04B 7/024 |
| | | | | 370/338 |
| 2009/0170578 A1 | 7/2009 | Richey et al. | | |
| 2009/0323652 A1* | 12/2009 | Chen | ............... | H04B 1/406 |
| | | | | 370/338 |
| 2010/0210299 A1* | 8/2010 | Gorbachov | ............... | H04B 1/0057 |
| | | | | 455/552.1 |
| 2010/0278117 A1* | 11/2010 | Sharma | ............... | H04W 36/06 |
| | | | | 370/329 |
| 2010/0303047 A1* | 12/2010 | Ibrahim | ............... | H04W 4/001 |
| | | | | 370/338 |
| 2010/0303183 A1* | 12/2010 | Desai | ............... | H04B 1/1027 |
| | | | | 375/350 |
| 2010/0322354 A1 | 12/2010 | Tanimoto | | |
| 2011/0222519 A1* | 9/2011 | Liao | ............... | H04L 27/2621 |
| | | | | 370/338 |
| 2011/0292919 A1 | 12/2011 | Trainin et al. | | |
| 2012/0213086 A1* | 8/2012 | Matsuura | ............... | H04B 7/04 |
| | | | | 370/241 |
| 2012/0258749 A1 | 10/2012 | Lenzini et al. | | |
| 2012/0275354 A1* | 11/2012 | Villain | ............... | H04L 27/0006 |
| | | | | 370/281 |
| 2012/0302155 A1 | 11/2012 | Marsolais et al. | | |
| 2013/0196673 A1* | 8/2013 | Smadi | ............... | H04W 56/001 |
| | | | | 455/450 |
| 2013/0288624 A1 | 10/2013 | Mujtaba et al. | | |
| 2013/0329586 A1* | 12/2013 | Mucke | ............... | H04W 24/02 |
| | | | | 370/252 |
| 2013/0329821 A1* | 12/2013 | Chen | ............... | H04L 5/0064 |
| | | | | 375/267 |
| 2014/0233679 A1* | 8/2014 | Rajagopal | ............... | H04L 27/2649 |
| | | | | 375/340 |
| 2014/0245059 A1 | 8/2014 | Ling | | |
| 2014/0341043 A1* | 11/2014 | Prydekker | ............... | H04W 36/08 |
| | | | | 370/241 |

OTHER PUBLICATIONS

International Application # PCT/IB2014/061531 Search Report dated Aug. 20, 2014.

IEEE Standard 802.11ac, "IEEE Standard for Information technology—Telecommunications and information exchange between systems Local and metropolitan area networks—Specific requirements, Part 11: Wireless LAN Medium Access Control(MAC) and Physical Layer (PHY) Specifications; Amendment 4: Enhancements for Very High Throughput for Operation in Bands below 6 GHz", 425 pages, Dec. 11, 2013.

IEEE 802.11k, "IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 1: Radio Resource Measurement of Wireless LANs", sections 11.10.8.3-11.10.8.4, Jun. 12, 2008.

ETSI Standard EN 301 893, "Broadband Radio Access Networks (BRAN);5 GHz high performance RLAN;Harmonized EN covering the essential requirements of article 3.2 of the R&TTE Directive", version 1.7.1, section 4.7, Jun. 30, 2012.

Brik et al., "Eliminating handoff latencies in 802.11 WLANs using Multiple Radios:Applications, Experience, and Evaluation", Proceedings of the 5th Conference on Internet Measurement, pp. 299-304, Oct. 31, 2005.

Briggs et al., "Dynamic Frequency Selection (DFS) and the 5GHz Unlicensed Band", Elliott Laboratories—An NTS Company, 11 pages, Nov. 20, 2009.

IEEE Std 802.11b, "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications:Higher-Speed Physical Layer Extension in the 2.4 GHz Band", 96 pages, Sep. 16, 1999.

IEEE 802.11g, "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 4: Further Higher Data Rate Extension in the 2.4 GHz Band", 78 pages, Jun. 27, 2003.

European Application # 15165810.1 Search Report dated Oct. 19, 2015.

U.S. Appl. No. 14/485,735 Office Action dated Apr. 8, 2016.

Orfanos et al., "Development and Performance Evaluation of an Adaptive MAC Protocol for MC-CDMA Wireless LANs with QoS Support", Department of Communication Networks (ComNets), Internet citation, pp. 43-70, Jun. 19, 2006 (http://www.comnets.rwth-aachen.de/publications/complete-lists/abstracts/2006/diss-orfanos-2006.html).

(56) References Cited

OTHER PUBLICATIONS

U.S. Appl. No. 14/583,121 Office Action dated Jan. 13, 2017.
U.S. Appl. No. 14/485,735 office Action dated Sep. 9, 2016.
U.S. Appl. No. 14/583,121 office Action dated Jul. 26, 2016.
U.S. Appl. No. 14/485,735 Office Action dated Sep. 20, 2017.

* cited by examiner

WLAN DEVICE WITH AUXILIARY RECEIVER CHAIN

CROSS-REFERENCE TO RELATED APPLICATIONS

This application claims the benefit of U.S. Provisional Patent Application 61/829,070, filed May 30, 2013, whose disclosure is incorporated herein by reference.

FIELD OF THE INVENTION

The present invention relates generally to wireless communication, and particularly to methods and systems for reception in Wireless Local Area Network (WLAN) devices.

BACKGROUND OF THE INVENTION

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013; and in the IEEE 802.11k-2008 standard entitled "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 1: Radio Resource Measurement of Wireless LANs," 2008, which are incorporated herein by reference. WLANs are also commonly referred to as Wi-Fi networks.

SUMMARY OF THE INVENTION

An embodiment of the present invention that is described herein provides a method including, in a Wireless Local Area Network (WLAN) device, communicating on a given communication channel using one or more primary transmission/reception (TX/RX) chains. Concurrently with communicating on the given communication channel using the primary TX/RX chains, signal activity is evaluated on one or more alternative communication channels using an auxiliary reception (RX) chain whose hardware is partially shared with one of the primary TX/RX chains.

In some embodiments, evaluating the signal activity includes verifying whether radar signals are present on the alternative communication channels. In an example embodiment, evaluating the signal activity including carrying out an off-channel Channel Availability Check (CAC) process. Additionally or alternatively, evaluating the signal activity may include collecting statistical signal activity data on the alternative communication channels. In some embodiments, in response to an event that warrants switching from the given communication channel, the primary TX/RX chains may be switched to communicate on an alternative communication channel identified using the auxiliary RX chain as suitable. In a disclosed embodiment, the method includes generating Local Oscillator (LO) signals for the primary TX/RX chains and for the auxiliary RX chain using respective different first and second frequency sources.

In some embodiments, the method includes providing an input signal for the auxiliary RX chain from an output of an amplifier in a primary TX/RX chain, designated from among the primary TX/RX chains. In an embodiment, the method includes setting a gain of the amplifier based on a signal received in the primary TX/RX chain. In another embodiment, the method includes setting a gain of the amplifier based on a signal received in the auxiliary RX chain. In yet another embodiment, in response to detecting a signal in only one of the auxiliary RX chain and the primary TX/RX chain, the method includes setting a gain of the amplifier based on the detected signal. In still another embodiment, the method includes setting a gain of the amplifier based on a signal received in the auxiliary RX chain in response to verifying that no signal is received in the primary TX/RX chain. In an embodiment, the method includes modifying a gain of the amplifier based on a signal received in the primary TX/RX chain, and compensating for the modified gain by adjusting a variable-gain element in the auxiliary RX chain.

In some embodiments, the method includes assigning baseband processing circuitry alternately between the auxiliary RX chain and a primary TX/RX chain, designated from among the primary TX/RX chains. Assigning the baseband processing circuitry may include assigning the baseband processing circuitry to the auxiliary RX chain only when no signal is to be processed by the primary TX/RX chain. In another embodiment, assigning the baseband processing circuitry includes, in response to detecting a signal in one of the auxiliary RX chain and the primary TX/RX chain, assigning the baseband processing circuitry to process the detected signal. In yet another embodiment, assigning the baseband processing circuitry includes initially assigning the baseband processing circuitry to the auxiliary RX chain, and, upon detecting a signal in the primary TX/RX chain, re-assigning the baseband processing circuitry to the primary TX/RX chain regardless of whether the auxiliary RX chain is processing signals.

In some embodiments, the method includes deactivating the auxiliary RX chain while one or more of the primary TX/RX chains are in a transmission mode. In a disclosed embodiment, evaluating the signal activity includes, for a given alternative communication channel having a first bandwidth, assessing the signal activity for multiple sub-channels of the given alternative communication channel, which have a second bandwidth that is smaller than the first bandwidth. Assessing the signal activity may include measuring a respective duty cycle of the signal activity in each of the sub-channels. In an embodiment, evaluating the signal activity includes assessing the signal activity on multiple alternative communication channels in parallel using both the auxiliary RX chain and the primary TX/RX chains.

There is additionally provided, in accordance with an embodiment of the present invention, a Wireless Local Area Network (WLAN) device including one or more primary transmission/reception (TX/RX) chains, an auxiliary reception (RX) chain and a control unit. The primary TX/RX chains are configured to communicate on a given communication channel. The auxiliary RX chain has hardware that is partially shared with one of the primary TX/RX chains. The control unit is configured to evaluate using the auxiliary RX chain signal activity on one or more alternative communication channels, concurrently with communication on the given communication channel using the primary TX/RX chains.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for WLAN communication. In the disclosed embodiments, a WLAN device (which may serve as an AP or STA) comprises one or more primary transmission/reception (TX/RX) chains for conducting WLAN communication with a remote WLAN device on a given communication channel. In addition, the WLAN device comprises an auxiliary reception RX chain that is configured to detect signals and evaluate signal activity on different communication channels, concurrently with the normal communication operation of the primary TX/RX chains.

Several possible uses of the auxiliary RX chain are described herein. In some embodiments, the auxiliary RX chain is used for identifying alternative channels that the WLAN device may choose to switch to if necessary. Evaluation of alternative channels may involve, for example, verifying that an alternative channel is free of radar signals, or mapping the signal activity across the band in order to find interference-free channels. Performing these tasks in parallel with normal communication enables the WLAN device to switch to an alternative channel instantly, and thus improves communication performance. In other embodiments, the auxiliary RX chain is used for collecting statistical signal activity data on alternative channels, e.g., for reporting purposes.

Several example implementations of the auxiliary RX chain are described herein. Hardware commonality aspects, Automatic Gain Control (AGC) design considerations and bandwidth selection considerations are also addressed.

System Description

Figure 1:
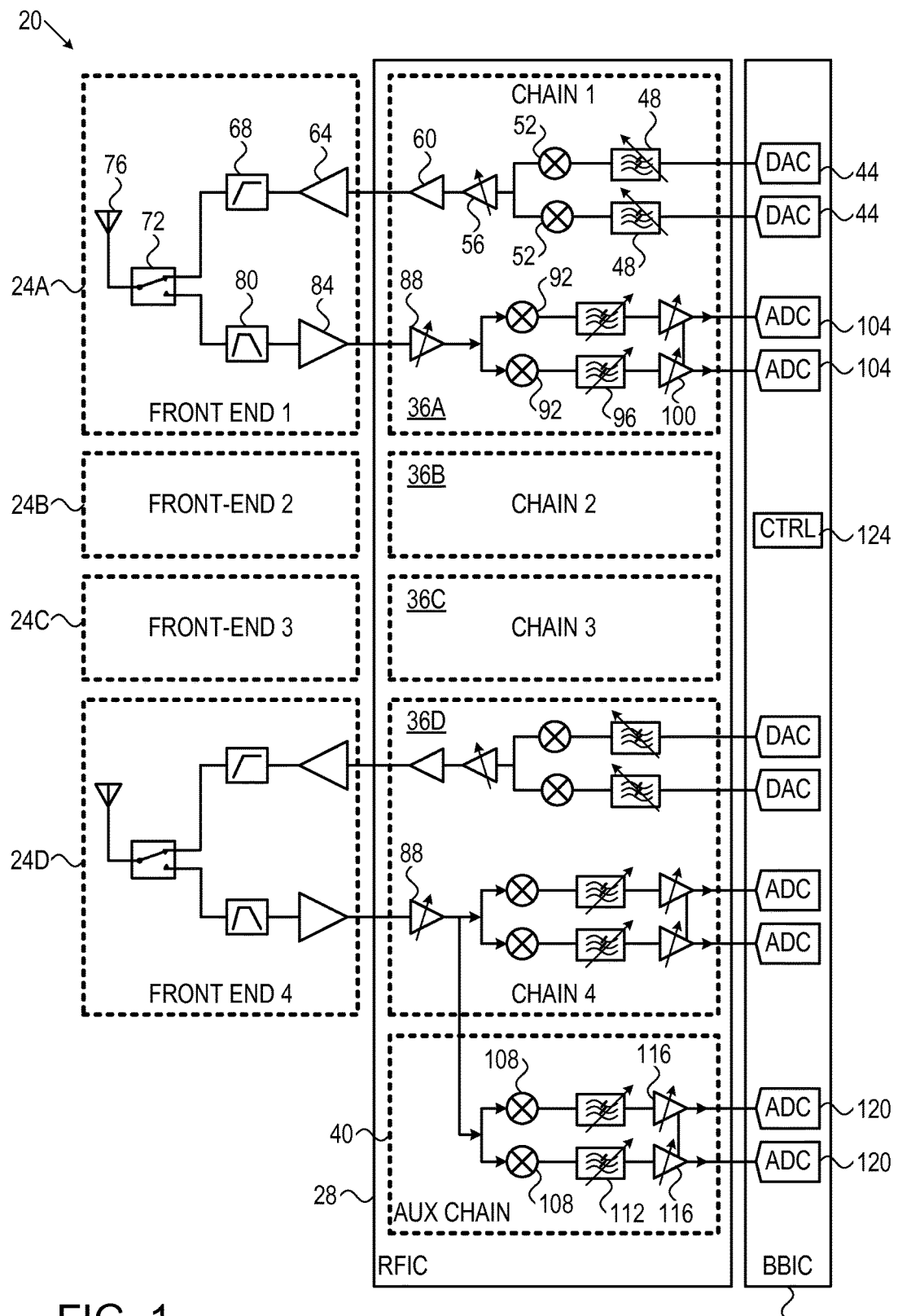
FIG. 1 is a block diagram that schematically illustrates a WLAN device, in accordance with an embodiment of the present invention.

FIG. 1 is a block diagram that schematically illustrates a WLAN device 20, in accordance with an embodiment of the present invention. Device 20 may operate as a WLAN Access Point (AP) or as a WLAN station (STA). Device 20 is configured to communicate with remote WLAN devices in accordance with a WLAN standard such as the IEEE 802.11 standards, cited above.

In the present example, device 20 transmits and receives WLAN signals using four transmission/reception (TX/RX) chains, also referred to as primary chains. The four TX/RX chains comprise four respective front-ends 24A . . . 24D and four respective Radio Frequency (RF) chains 36A . . . 36D. RF chains 36A . . . 36D are comprised in an RF Integrated Circuit (RFIC) 28. Baseband processing of the transmitted and received signals is performed in a Baseband Integrated Circuit (BBIC) 32. BBIC 32 also comprises a control unit 124, which controls and manages the operation of device 20.

In each TX/RX chain, the transmit path begins in BBIC 32, which generates a digital baseband signal for transmission. A pair of Digital to Analog Converters (DACs) convert the digital baseband signal into an analog signal. In the corresponding RF chain, a pair of Band-Pass Filters (BPFs) 48 filter the analog signal, a pair of mixers 52 up-convert the signal to RF, and amplifiers 56 and 60 amplify the RF signal. In the respective front-end, a Power Amplifier (PA) 64 amplifies the RF signal. The signal is then filtered with a Low-Pass Filter (LPF) 68, and provided via a TX/RX switch 72 to an antenna 76.

In the receive path of each TX/RX chain, antenna 76 receives an RF signal, and the signal passes through switch 72 and is filtered by a filter 80. A Low-Noise Amplifier (LNA) 84, referred to as an external LNA, amplifiers the signal before providing it to the corresponding RF chain in RFIC 28. In the RFIC, the signal is amplified by an additional LNA 88, referred to as an internal LNA. A pair of mixers 92 down-convert the RF signal to baseband, a pair of baseband filters 96 filter the down-converted signal, and the signal is then amplified by a pair of Variable-Gain Amplifiers (VGAs) 100. The baseband signal is then provided to BBIC 32, where it is converted into a digital signal by a pair of Analog-to-Digital Converters (ADCs) 104. The BBIC then proceeds to demodulate the digital signal. In a WLAN, the signal may comprise, for example, an Orthogonal Frequency Division Multiplexing (OFDM) signal.

The four TX/RX chains of device 20 are typically tuned to the same communication channel, so as to support various diversity or Multiple-Input Multiple-Output (MIMO) schemes. Thus, mixers 92 in the four RF chains 36A . . . 36D are typically driven with the same Local Oscillator (LO) frequency. The channel frequency on which the four TX/RX chains communicate is denoted frequency A, and the corresponding LO signal is typically generated in a single synthesizer (or other frequency source, not shown in the figure).

In each TX/RX chain, LNA 88 and VGAs 100 have variable gains, which are typically controlled by control unit 124 as part of an Automatic Gain Control (AGC) mechanism. In an example implementation, the AGC mechanism may set the gains of LNA 88 and VGAs 100 such that LNA 84, LNA 88 and ADCs 104 do not saturate.

In addition to the four primary TX/RX chains, device 20 further comprises an auxiliary reception (RX) chain 40. Auxiliary chain 40 is typically used for analyzing signal activity on alternative communication channels. The signal activity evaluation can be used, for example, for identifying alternative channels that device 20 may later choose to switch to, or for collecting statistical activity data. (Throughout the present patent application, the terms "channels," "frequency channels" and "communication channels" are used interchangeably.) In example embodiments, chain 40 is used for verifying that an alternative channel is free of radar signals, or free of interference in general. The use of auxiliary chain 40 is addressed in greater detail below.

In the example of FIG. 1, auxiliary chain 40 shares the antenna, the front-end and also the internal LNA of one of the primary TX/RX chains. In other words, the input to auxiliary chain 40 is the RF signal produced by internal LNA 88 of one of the primary TX/RX chains. A pair of mixers 108 down-convert this RF signal to baseband, a pair of baseband filters 112 filter the down-converted signal, and the signal is then amplified by a pair of Variable-Gain Amplifiers (VGAs) 116. The baseband signal of the auxiliary chain is provided to BBIC 32, where it is converted into a digital signal by a pair of Analog-to-Digital Converters (ADCs) 120.

Providing the input to the auxiliary chain from the LNA output of a primary chain is advantageous for several reasons. For example, since most of the RF hardware is shared between the primary and auxiliary chains, the added cost, size and power consumption incurred by the auxiliary chain is small. Moreover, the LNA output typically has a high impedance, which simplifies splitting of the signal. After the split, the signal is typically converted to current before down-conversion in the mixers. Furthermore, since the splitting is performed after the LNA, the impact of the split on the sensitivity or noise figure of the primary chain is minimal, typically less than 1 dB. When the primary chain in question is one of several (e.g., four) primary chains, the impact of the split on the overall reception performance is typically negligible.

Auxiliary chain 40 is typically used for analyzing alternative channels while the other TX/RX chains communicate on frequency A. The frequency on which the auxiliary chain receives at a given time is denoted frequency B. The corresponding LO signal, for driving mixers 108, is typically generated by an additional synthesizer (or other frequency source, different from the frequency source that drives mixers 92).

In some embodiments, the additional synthesizer used for the auxiliary chain may be designed for lower performance (and thus lower cost) than that of the synthesizer of the primary chains. For example, auxiliary chain 40 is typically used only for signal detection rather than demodulation, whereas the primary chains are used for signal demodulation. As such, the performance requirements from auxiliary chain 40 are typically more relaxed than the performance requirements from the primary chains. This relaxation enables the auxiliary chain to be implemented with lower cost. (Following the same rationale, other components of the auxiliary chain, such as mixers 108 or analog front-end components, may be designed with relaxed performance relative to the corresponding components in the primary chains.)

In some embodiments, device 20 already comprises a second synthesizer for some other operating mode or purpose. In such an embodiment, the existing second synthesizer can be re-used for driving the auxiliary chain, further minimizing the added cost, size and power consumption.

The configuration of WLAN device 20 shown in FIG. 1 is an example configuration, which is chosen purely for the sake of conceptual clarity. In alternative embodiments, any other suitable device configuration can be used. For example, device 20 may comprise any suitable number of TX/RX chains, or even a single chain. The various reception and transmission paths in device 20 of FIG. 1 are implemented in an In-Phase/Quadrature (I/Q) configuration. Alternatively, some or all of the reception and/or transmission paths may be implemented using zero IF configuration with a single real BB signal.

The division of functions among the front-ends, RFIC or BBIC may differ from the division shown in FIG. 1. The RFIC and BBIC may be integrated in a single device (e.g., on a single silicon die) or implemented in separate devices (e.g., separate silicon dies). Further alternatively, the entire functionality of the front ends may be implemented in the RFIC, or device 20 may be implemented without an RFIC. In the front-ends, filter 80 may be inserted after LNA 84 rather than before the LNA. In other configurations filter 80 and/or LNA 84 may be omitted.

The different elements of device 20 may be implemented using suitable hardware, such as in one or more RFICs, Application-Specific Integrated Circuits (ASICs) or Field-Programmable Gate Arrays (FPGAs). In some embodiments, some elements of device 20, e.g., control unit 124, can be implemented using software, or using a combination of hardware and software elements. Elements of device 20 that are not mandatory for understanding of the disclosed techniques have been omitted from the figure for the sake of clarity.

In some embodiments, control unit 124 is implemented using a general-purpose processor, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. This processor may be internal or external to the BBIC.

Coexistence with Radar Signals

In some frequency bands, e.g., in part of the 5 GHz band, regulatory requirements specify that WLAN device 20 must detect the presence of radar signals and, if detected, switch to a different channel. Such channels are referred to as Dynamic Frequency Selection (DFS) channels. This requirement holds both before and during communication.

Before starting communication on a given channel, device 20 is required to verify that the channel is free of radar signals for at least sixty seconds. This mechanism is referred to as Channel Availability Check (CAC). In addition, device 20 is required to check for radar signals during normal communication, and switch to a different channel if a radar signal appears on the currently-used channel. This mechanism is referred to as In-Service Monitoring (ISM).

The CAC and ISM mechanisms are specified, for example, in ETSI Standard EN 301 893 entitled "Broadband Radio Access Networks (BRAN); 5 GHz high performance RLAN; Harmonized EN covering the essential requirements of article 3.2 of the R&TTE Directive," version 1.7.0, January, 2012, which is incorporated herein by reference. Section 4.7 of this standard addresses DFS operation, including avoidance of co-channel operation with radar systems. Section 4.7.2.2 specifies an off-channel CAC mechanism that monitors channels different from the operating channel for the presence of radar signals.

In some embodiments, control unit 124 uses auxiliary chain 40 to evaluate alternative communication channels for the presence/absence of radar signals, concurrently with the normal communication of device 20 using the four primary TX/RX chains. In an example embodiment, device 20 communicates (e.g., actively communicating with a remote device or waiting for remote devices to associate) using the primary TX/RX chains (on frequency A). In parallel, control unit 124 instructs auxiliary chain 40 to tune to one or more alternative channels (on different frequencies denoted B), and attempt to detect the presence of a radar signal.

Using this mechanism, device 20 is able to switch to an alternative channel immediately if a radar signal appears on frequency A, without having to wait for sixty seconds in order to verify that the alternative channel is clear. In an embodiment, this mechanism enables device 20 to implement off-channel CAC (specified in EN 301 893, cited above) efficiently and without disruption to normal operation.

Radar signal detection using auxiliary chain 40 is also useful in scenarios in which device 20 operates alternately on two frequency channels, with a certain duty cycle. This sort of scenario occurs, for example, in "WiFi Direct" operation, in which device 20 is associated with an Access Point (AP) on frequency A and at the same time conducts a "WiFi direct" session on frequency B. Typically, device 20 would toggle between frequencies A and B. However, if frequency B is a DFS channel, device 20 is not permitted to start operating on this channel immediately. In an embodiment, auxiliary chain 40 continuously monitors frequency B for radar signals, and thus allows uninterrupted toggling between the channels.

Figure 2:
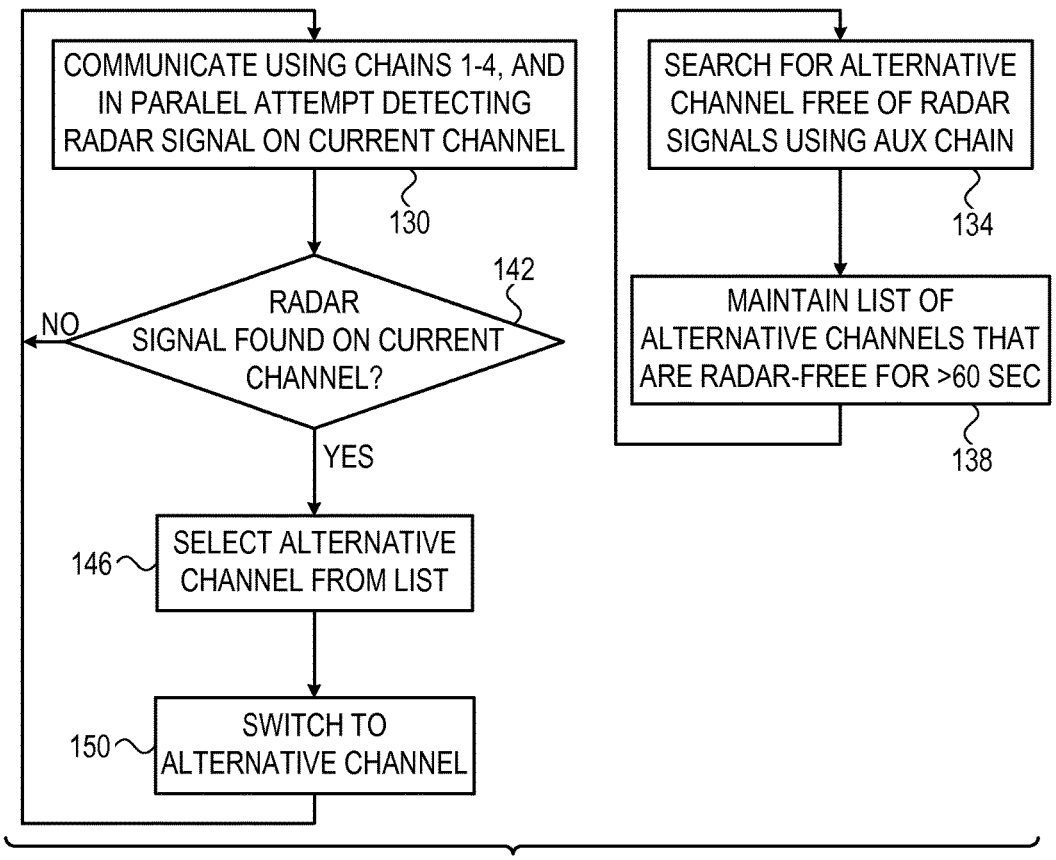
FIG. 2 is a flow chart that schematically illustrates a method for coexistence with radar signals in a WLAN device, in accordance with an embodiment of the present invention.

FIG. 2 is a flow chart that schematically illustrates a method for coexistence with radar signals in WLAN device 20, in accordance with an embodiment of the present invention. The method involves two processes that are performed in parallel—Communication with a remote WLAN device, and concurrent evaluation of alternative channels. Both processes are controlled and coordinated by control unit 124.

At a communication step 130, device 20 communicates (e.g., actively communicates with a remote WLAN device or waits for remote devices to associate) using the primary TX/RX chains. In parallel, at a searching step 134, device 20 searches for alternative channels using auxiliary chain 40. At a listing step 138, control unit 124 maintains a list of alternative channels, which have been found to be free of radar signals for at least sixty seconds. Each of the channels on the list is thus a valid channel that device 20 is permitted to switch to if necessary.

(The sixty-second time interval defined above may be configurable by control unit 124. For example, the auxiliary chain is typically inactive during transmission periods of the primary chains, and therefore the time interval in question may depend on the duty cycle of reception in the primary chains. In case of prolonged TX intervals, control unit 124 may set a longer time interval, and vice versa.)

At a checking step 142, device 20 checks whether a radar signal is found on the currently-used channel (the channel used at step 130 by the primary chains). Typically although not necessarily, detection of a radar signal on the currently-used channel is carried out using the signals received via the primary chains, not using auxiliary chain 40. If a radar signal is detected on the currently-used channel, control unit 124 selects an alternative channel from the above-described list, at an alternative channel selection step 146. The control unit then instructs the primary chains to switch to the selected alternative channel, at a channel switching step 150. Coordination of the channel switching with the remote WLAN device can be carried out in any suitable way, and is outside the scope of this disclosure.

The method of FIG. 2 is depicted purely by way of example. In alternative embodiments, device 20 may evaluate and switch to an alternative channel using any other suitable method.

Efficient Band Mapping

In some embodiments, device 20 uses auxiliary chain 40 to map the signal activity across the different channels of the operating band, in parallel with the normal operation conducted using the primary chains. This mapping can later be used, for example, for selecting an alternative channel for device 20 to switch to. In particular, the activity mapping can be used for identifying alternative channels that are free (or at least relatively free) of interference. Another possible use of signal activity mapping is for reporting purposes, for example in order to implement the IEEE 802.11k-2008 standard, cited above.

In some embodiments, device 20 uses auxiliary chain to measure the power and time duration of RF energy pulse events, per channel. A pulse event may be indicative, for example, of a transmitted communication frame. In some embodiments, device 20 uses the auxiliary chain to construct an energy/activity histogram profile per channel. Such a histogram typically shows the lengths of time during which respective power levels were measured on the channel in question. A collection of such profiles for multiple respective channels provides an overall activity mapping of the frequency band. The mapping may be constructed without interrupting normal operation by the primary TX/RX chains.

In addition to activity mapping, the auxiliary chain can measure the signal per channel using various detectors, in order to identify or classify the received signals. An example detector may comprise a detector for the preamble of the IEEE 802.11 signal. This detector may be implemented, for example, by correlating the received signal with a known sequence, or by auto-correlating the received signal and identifying known periodicity that is present in the preamble signal.

Figure 3:
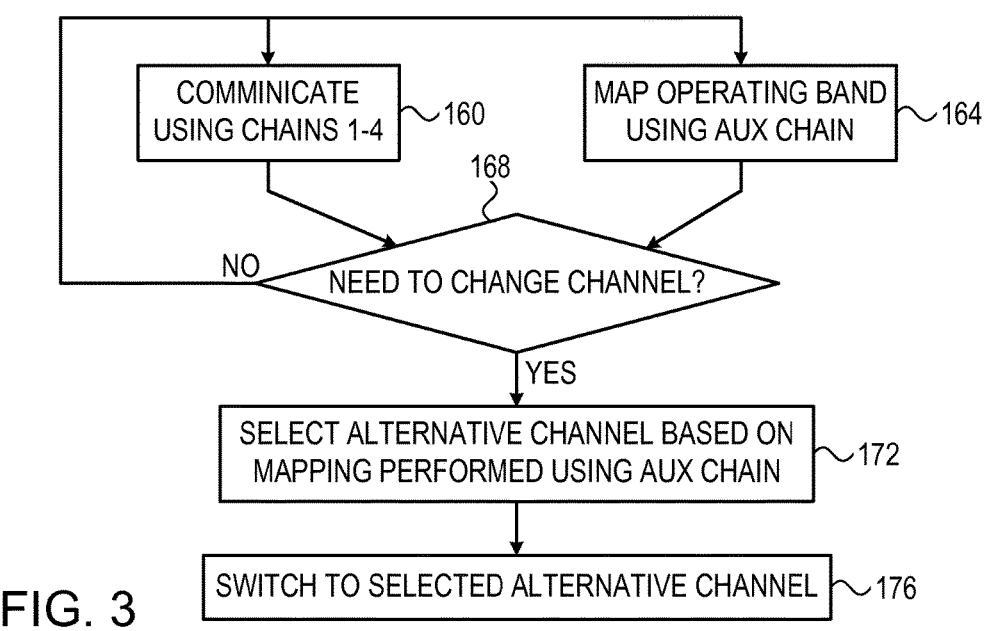
FIG. 3 is a flow chart that schematically illustrates a method for channel switching in a WLAN device, in accordance with an embodiment of the present invention.

FIG. 3 is a flow chart that schematically illustrates a method for channel switching in WLAN device 20, in accordance with an embodiment of the present invention. This method demonstrates one possible use of the signal activity mapping performed using auxiliary chain 40.

The method begins with device 20 communicating with a remote WLAN device, or waiting for remote devices to associate, using the primary TX/RX chains, at a normal operation step 160. In parallel, at a mapping step 164, device 20 maps the interference conditions on one or more alternative channels across the operating band using auxiliary chain 40. In an example embodiment, control unit measures and records the interference level for each mapped channel.

Control unit 124 checks whether a need arises to switch from the currently-used channel, at a change checking step 168. Channel switching can be triggered, for example, by detection of a radar signal, by a degradation in communication quality, or by any other suitable condition. If device 20 may remain on the currently-used channel, the method loops back to steps 160 and 164 above.

Otherwise, at a channel selection step 172, control unit 124 selects an alternative channel based on the mapping performed at step 164 above. In an example embodiment, control unit 124 selects the alternative channel having the lowest interference level. Alternatively, any other suitable selection criterion can be used. The control unit then instructs the primary chains to switch to the selected alternative channel, at a channel switching step 176. The method may then loop back to steps 160 and 164.

The flows of FIGS. 2 and 3 above are depicted purely by way of example. In alternative embodiments, device 20 may operate the auxiliary RX chain in any other suitable manner and for any other suitable purpose. For example, on a given channel, the auxiliary RX chain may check for the presence of a radar signal and map the signal activity in general at the same time. Signal activity evaluation by the auxiliary chain can be used, for example, for reporting channel load and noise histogram, as specified in sections 11.10.8.3 and 11.10.8.4 of IEEE 802.11k-2008, or for initial fast channel scanning after power-up.

AGC Considerations

As noted above, in some embodiments control unit 124 carries out an Automatic Gain Control (AGC) process that controls the gains of LNAs 88 and VGAs 100 in the various primary chains depending on the received signal. In some embodiments, control unit 124 also controls the gains of VGAs 116 in auxiliary chain 40.

As can be seen in FIG. 1, some of the reception circuitry, and in particular LNA 88 of chain 36D, is common to primary RF chain 36D ("chain 4") and to auxiliary chain 40. In the description that follows, this LNA is referred to as the "common LNA." The gain setting of the common LNA affects the signal level in both chains, which may be sub-optimal for at least one of the chains. In some use cases the resulting performance degradation is small and tolerable. In some embodiments the control unit takes measures to reduce the degradation. In any case, the VGAs of the two chains (VGAs 96 in primary chain 36D and VGAs 116 in auxiliary chain 40) can still be set independently, and thus compensate for at least some of the sub-optimal LNA gain setting.

In one embodiment, control unit 124 sets the gain of the common LNA based on the requirements of the primary chain, i.e., based on the signal received in primary chain 36D on frequency A. In this embodiment the gain of the auxiliary chain may be suboptimal.

In another embodiment, control unit 124 sets the gain of the common LNA based on the requirements of the auxiliary chain, i.e., based on the signal received in auxiliary chain 40 on frequency B. In this embodiment the gain of primary chain 36D may be suboptimal. This degradation may be tolerable, especially since chain 36D is just one of multiple (in the present example four) chains.

In yet another embodiment, if a signal is detected only in one of the two chains (on frequency A in chain 36D or on frequency B in chain 40), control unit 124 sets the gain of the common LNA based on that signal. This mechanism is particularly suitable for intermittent or packetized protocols such as IEEE 802.11 WLAN.

In still another embodiment, the control unit may set the gain of the common LNA while considering the requirements of both chains, e.g., set the LNA to some average of the gain requirements of the two chains. Further alternatively, control unit 124 may control the gain of the common LNA in any other suitable way.

In some embodiments, the primary chain notifies the auxiliary chain of each gain change applied to the common LNA. The auxiliary chain aims to maintain a target overall gain (which may be configurable, and may have different optimal settings for radar detection and for activity monitoring). Upon receiving a notification, the auxiliary chain attempts to compensate for the LNA gain change by changing the gain of VGAs 116, such that the target overall gain is maintained of the auxiliary chain. This feature is useful, for example, in statistics gathering scenarios, in which it is important for the auxiliary chain to have accurate knowledge of its current gain. The notifications and gain changes are typically managed by control unit 124.

Additionally, a "VALID" signal may be sent from the primary chain to the auxiliary chain. The VALID signal is de-asserted after the gain of the common LNA is changed, and re-asserted when the gain change settles. When the VALID signal is de-asserted, auxiliary chain operation is paused, to prevent false detection due to gain instability effects.

Sharing Baseband Circuitry Between Primary and Auxiliary Chains

In some embodiments, some of the processing circuitry in BBIC 32 is shared by the fourth primary chain and by auxiliary chain 40. The shared circuitry may comprise, for example, circuitry for detecting radar pulses, circuitry for measuring interference, and/or any other suitable circuitry. In an example embodiment, the shared circuitry is connected to the fourth primary chain and to the auxiliary chain through a multiplexer, which is controlled by control unit 124. The control unit may use various criteria for deciding when to assign the shared baseband circuitry to which chain.

In some embodiments, priority in assignment of the shared baseband circuitry is given to the fourth primary chain, and the control unit assigns the circuitry to the auxiliary chain only if the fourth primary chain has no signal to process. In one embodiments, if a signal appears in the fourth primary chain while the shared baseband circuitry is processing a signal for the auxiliary chain, control unit 124 aborts the processing and immediately assigns the shared baseband circuitry to the fourth primary chain. In another embodiment, the control unit waits until processing for the auxiliary chain is completed, and only then assigns the shared baseband circuitry to the fourth primary chain.

In some embodiments, when a signal is detected only in one of the chains (the fourth primary chain and to the auxiliary chain), control unit may switch the shared baseband circuitry to that chain in order to process the detected signal.

In some embodiments, when the shared baseband circuitry is assigned to the auxiliary RX chain, control unit 124 deactivates at least part of the fourth primary chain in order to reduce power consumption. In one embodiment all other primary chains are deactivated, as well. In another embodiments, the remaining three primary chains remain active, and continue normal communication without the fourth chain, possibly at reduced performance.

In some embodiments, when one or more of the primary chains is transmitting, control unit 124 deactivates auxiliary chain 40, or at least stops processing the signal produced by the auxiliary chain. The rationale behind this mechanism is that transmission from the nearby primary chains is likely to saturate or otherwise distort reception in the auxiliary chain.

Bandwidth Considerations

In some embodiments, the primary TX/RX chains and the auxiliary RX chain can be configured by control unit 124 to operate at various bandwidths. Generally, the control unit may decide to set the bandwidth of the primary chains and the bandwidth of the auxiliary chain to the same bandwidth or to different bandwidths. In one embodiment, the supported bandwidths are 20 MHz, 40 MHz and 80 MHz, as specified in IEEE 802.11ac.

When performing signal activity mapping, in some embodiments the auxiliary chain measures signal activity on a given channel at two or more bandwidths and/or center frequencies within that channel. For example, if configured for a bandwidth of 80 MHz, the auxiliary chain can evaluate signal activity per 20 MHz sub-channel. This feature can be used by device 20 to determine in which sub-channel the interference is most active, and to select the operating bandwidth accordingly.

The 802.11 standard designates one of the 20 MHz sub-channels of the 80 MHz channel as a primary 20 MHz sub-channel, denoted 20p. Similarly, one of the 40 MHz sub-channels is designated as a primary 40 MHz sub-channel denoted 40p. The remaining 20 MHz and 40 MHz sub-channels are designated as secondary, and denoted 20s and 40s. The standard requires implementing a Clear Channel Assessment (CCA) circuit for detection of signal activity in the 20p, 20s, 40p and 40s sub-channels.

In some embodiments, BBIC 32 comprises circuitry that produces CCA indications for the various sub-channels (e.g., 20p, 20s, 40p and 40s) of the channel received by the auxiliary chain. A CCA indication is typically high when the energy in the respective sub-channel is above a configurable threshold, and is low otherwise. In some embodiments, instead of computing a full-fledged activity histogram per sub-channel, the circuitry measures the duty cycle of the CCA indication produced for each sub-channel.

When selecting the bandwidth to be used by the auxiliary chain, a trade-off between evaluation speed and quality may arise. On the one hand, mapping signal activity across the band is faster when operating at the widest bandwidth, especially since the activity can still be assessed per sub-channel. On the other hand, signal detection reliability can be degraded when the bandwidth is increased.

In some embodiments, the auxiliary chain is used for fast passive scanning of the operating band. In a passive scan, device 20 (serving as AP) monitors the spectrum without trying to actively probe it for other APs. Passive scan is typically performed after system power-up, in order to determine the operating channel. For example, control unit 124 may choose to operate on a channel having the least activity. In some embodiments, the primary chains and the auxiliary chain can be used to perform passive scanning in parallel over different frequency channels, thus doubling the scan speed.

Fast passive scan (using both the primary and auxiliary chains) is also valuable upon channel change, e.g., as a result of interference on the primary channel, in particular in cases wherein the auxiliary chain synthesizer is used for other purposes during normal operation. Performing fast passive scanning upon channel change is particularly important since it minimizes the disruption of traffic communication.

In some embodiments, signal activity evaluation per bandwidth can also be used for selecting the operating channel bandwidth for device 20, e.g., depending on interference.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a Wireless Local Area Network (WLAN) device, tuning one or more primary transmission/reception (TX/RX) chains to a given communication channel;
tuning an auxiliary reception (RX) chain, which shares a common antenna and a common Low-Noise Amplifier (LNA) with a primary TX/RX chain designated from among the primary TX/RX chains, to one or more alternative communication channels using the common antenna and the common LNA;
setting a gain of the common LNA, by:
checking whether signals are received in both the auxiliary RX chain and the primary TX/RX chain, or whether a signal is received in only one of the auxiliary RX chain and the primary TX/RX chain;
when the signals are received in both the auxiliary RX chain and the primary TX/RX chain, setting the gain of the common LNA either based on a first signal received via the common LNA by the primary TX/RX chain on the given communication channel, or based on a second signal received via the common LNA by the auxiliary RX chain on the one or more alternative communication channels;
otherwise, when the signal is received only in the auxiliary RX chain and not in the primary TX/RX chain, setting the gain of the common LNA based on the signal received in the auxiliary RX chain; and
otherwise, when the signal is received only in the primary TX/RX chain and not in the auxiliary RX chain, setting the gain of the common LNA based on the signal received in the primary TX/RX chain; and
after setting the gain of the common LNA, communicating via the common LNA on the given communication channel using the one or more primary TX/RX chains, and concurrently performing signal reception via the common LNA on the one or more alternative communication channels using the auxiliary RX chain.

2. The method according to claim 1, wherein performing the signal reception comprises verifying whether radar signals are present on the alternative communication channels.

3. The method according to claim 1, wherein performing the signal reception comprises carrying out an off-channel Channel Availability Check (CAC) process.

4. The method according to claim 1, wherein performing the signal reception comprises collecting statistical signal activity data on the alternative communication channels.

5. The method according to claim 1, and comprising, in response to an event that warrants switching from the given communication channel, switching the primary TX/RX chains to communicate on an alternative communication channel identified using the auxiliary RX chain as suitable.

6. The method according to claim 1, and comprising generating Local Oscillator (LO) signals for the primary TX/RX chains and for the auxiliary RX chain using respective different first and second frequency sources.

7. The method according to claim 1, and comprising, when the gain of the common LNA is set based on the first signal received in the primary TX/RX chain, compensating for the gain by adjusting a variable-gain element in the auxiliary RX chain.

8. The method according to claim 1, and comprising assigning baseband processing circuitry alternately between the auxiliary RX chain and the primary TX/RX chain, designated from among the primary TX/RX chains.

9. The method according to claim 8, wherein assigning the baseband processing circuitry comprises assigning the baseband processing circuitry to the auxiliary RX chain only when no signal is to be processed by the primary TX/RX chain.

10. The method according to claim 8, wherein assigning the baseband processing circuitry comprises, in response to detecting a signal in one of the auxiliary RX chain and the primary TX/RX chain, assigning the baseband processing circuitry to process the detected signal.

11. The method according to claim 8, wherein assigning the baseband processing circuitry comprises initially assigning the baseband processing circuitry to the auxiliary RX chain, and, upon detecting a signal in the primary TX/RX chain, re-assigning the baseband processing circuitry to the primary TX/RX chain regardless of whether the auxiliary RX chain is processing signals.

12. The method according to claim 1, and comprising deactivating the auxiliary RX chain while one or more of the primary TX/RX chains are in a transmission mode.

13. The method according to claim 1, wherein comprises, for a given alternative communication channel having a first bandwidth, assessing signal activity for multiple sub-channels of the given alternative communication channel, which have a second bandwidth that is smaller than the first bandwidth.

14. The method according to claim 13, wherein assessing the signal activity comprises measuring a respective duty cycle of the signal activity in each of the sub-channels.

15. The method according to claim 1, wherein performing the signal reception comprises assessing signal activity on multiple alternative communication channels in parallel using both the auxiliary RX chain and the primary TX/RX chains.

16. A Wireless Local Area Network (WLAN) device, comprising:
one or more primary transmission/reception (TX/RX) chains, which are configured to communicate on a given communication channel;
an auxiliary reception (RX) chain, which shares a common antenna and a common Low-Noise Amplifier (LNA) with a primary TX/RX chain designated from among the primary TX/RX chains, and which is configured to receive on one or more alternative communication channels using the common antenna and the common LNA; and
a control unit, which:
tunes the auxiliary RX chain to the one or more alternative communication channels,
tunes the primary TX/RX chains to the given communication channel;
sets a gain of the common LNA, by:
checking whether signals are received in both the auxiliary RX chain and the primary TX/RX chain, or whether a signal is received in only one of the auxiliary RX chain and the primary TX/RX chain;
when the signals are received in both the auxiliary RX chain and the primary TX/RX chain, setting the gain of the common LNA either based on a first signal received via the common LNA by the primary TX/RX chain on the given communication channel, or based on a second signal received via the common LNA by the auxiliary RX chain on the one or more alternative communication channels;
otherwise, when the signal is received only in the auxiliary RX chain and not in the primary TX/RX chain, setting the gain of the common LNA based on the signal received in the auxiliary RX chain; and
otherwise, when the signal is received only in the primary TX/RX chain and not in the auxiliary RX chain, setting the gain of the common LNA based on the signal received in the primary TX/RX chain; and
after setting the gain of the common LNA, communicates via the common LNA on the given communication channel using the one or more primary TX/RX chains, and concurrently performs signal reception via the common LNA on the one or more alternative communication channels using the auxiliary RX chain.

17. The WLAN device according to claim 16, wherein the auxiliary RX chain is configured to verify whether radar signals are present on the alternative communication channels.

18. The WLAN device according to claim 16, wherein the auxiliary RX chain is configured to carry out an off-channel Channel Availability Check (CAC) process.

19. The WLAN device according to claim 16, wherein the auxiliary RX chain is configured to collect statistical signal activity data on the alternative communication channels.

20. The WLAN device according to claim 16, wherein, in response to an event that warrants switching from the given communication channel, the control unit switches the primary TX/RX chains to communicate on an alternative communication channel identified using the auxiliary RX chain as suitable.

21. The WLAN device according to claim 16, and comprising first and second different frequency sources, which are configured to generate Local Oscillator (LO) signals for the primary TX/RX chains and for the auxiliary RX chain, respectively.

22. The WLAN device according to claim 16, wherein, when the gain of the common LNA is set based on the first signal received in the primary TX/RX chain, the control unit compensates for the gain by adjusting a variable-gain element in the auxiliary RX chain.

23. The WLAN device according to claim 16, wherein the control unit assigns baseband processing circuitry alternately between the auxiliary RX chain and the primary TX/RX chain, designated from among the primary TX/RX chains.

24. The WLAN device according to claim 23, wherein the control unit assigns the baseband processing circuitry to the auxiliary RX chain only when no signal is to be processed by the primary TX/RX chain.

25. The WLAN device according to claim 23, wherein the control unit assigns the baseband processing circuitry, in response to detecting a signal in one of the auxiliary RX chain and the primary TX/RX chain, so as to process the detected signal.

26. The WLAN device according to claim 23, wherein the control unit initially assigns the baseband processing circuitry to the auxiliary RX chain, and, upon detecting a signal in the primary TX/RX chain, re-assigns the baseband processing circuitry to the primary TX/RX chain regardless of whether the auxiliary RX chain is processing signals.

27. The WLAN device according to claim 16, wherein the control unit deactivates the auxiliary RX chain while one or more of the primary TX/RX chains are in a transmission mode.

28. The WLAN device according to claim 16, wherein, for a given alternative communication channel having a first bandwidth, the auxiliary RX chain is configured to evaluate signal activity for multiple sub-channels of the given alternative communication channel, which have a second bandwidth that is smaller than the first bandwidth.

29. The WLAN device according to claim 28, wherein the auxiliary RX chain is configured to evaluate the signal activity by measuring a respective duty cycle of the signal activity in each of the sub-channels.

30. The WLAN device according to claim 16, wherein the auxiliary RX chain is configured to assess signal activity on multiple alternative communication channels in parallel using both the auxiliary RX chain and the primary TX/RX chains.

\* \* \* \* \*